Oct. 7, 1930.  C. W. QUIMBY  1,777,984
PACKING
Filed July 20, 1928
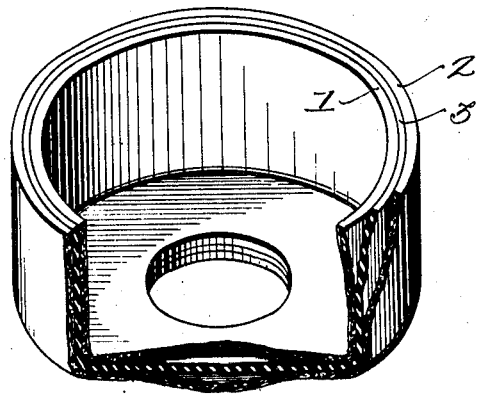
Inventor
Charles W. Quimby,
by his Attorneys
Howson & Howson Patented Oct. 7, 1930

1,777,984

UNITED STATES PATENT OFFICE

CHARLES W. QUIMBY, OF PHILADELPHIA, PENNSYLVANIA, ASSIGNOR TO E. F. HOUGHTON & COMPANY, OF PHILADELPHIA, PENNSYLVANIA, A CORPORATION OF PENNSYLVANIA

PACKING

Application filed July 20, 1928. Serial No. 294,301.

The principal object of this invention is to provide a novel form of packing which shall have certain advantages over and be generally more efficient than the same type of packing made in accordance with the prior practices.

More specifically, an object of the invention is to provide a packing which while having all the desirable qualities of the leather or similar packing elements now generally used, will also have in a more pronounced degree than those elements certain desirable physical characteristics such as resiliency.

In the attached drawing, the figure is a view in perspective of a cup-packing partly cut away, which packing is made in accordance with the present invention.

I have discovered that highly desirable packings having material advantages over the packings now generally used for similar purposes may be obtained by a judicious combination of rubber with the leather or other materials of which packings are now generally made. I have found that resilient rubber may be introduced into packings of practically any character, and particularly those of leather, without adversely affecting the desirable characteristics of the packing and at the same time conferring upon the packing certain highly desirable characteristics, such as pronounced resiliency and compressibility, and self-adaptability to the surfaces between which the packing is confined, these characteristics adding materially to the efficiency of the packing. Preferably, the rubber is so combined with the other materials of the packing as to be embraced by the latter in such manner that the rubber does not come into frictional contact with any of the surfaces of the mechanism with which the packing may be used. In some instances, however, it may be desirable to have the rubber function as one of the contact or wear surfaces of the packing member, and there is to be no limitation in this respect.

As a highly desirable form of packing made in accordance with the present invention, I may form a composite rubber and leather packing in which a layer of resilient rubber is confined between two layers of leather. In the attached drawing, I have illustrated a cup leather so made, this packing comprising inner and outer layers 1 and 2 of leather and an intermediate layer 3 of resilient rubber.

The method of forming a packing of this type may vary largely, and it is preferable that some means be employed to effect a bond between the leather and rubber, and this union of the materials may be effected in various ways, such for example as by use of a suitable cement or by vulcanization. Obviously, the bonding operation may be effected in the blank and prior to the shaping of the packing element, or the bonding operation may occur at any other point in the process of manufacture. The vulcanizing operation by means of which the leather and rubber materials are made to adhere may occur in the operation of forming the cup leather from the flat stock.

Obviously, there may be considerable modification both in the form of the packing and in the process of making it. A desirable packing may be formed, for example, by replacing one of the leather layers by means of some other suitable material, such for example as canvas; or one of the layers of leather may be entirely eliminated. Also the leather or other materials may be impregnated with waxes or other compositions not injurious to the rubber material to render the packing suitable for any purpose for which it may be used. This impregnation obviously may occur prior to the combination of the leather or other materials with the rubber or at any time in the course of manufacture. It will also be apparent that various types of rubber compositions may be used as the rubber material without departure from the invention.

I claim:

1. As a new article of manufacture, a shaped composite packing element comprising leather and resilient sheet rubber.

2. A composite shaped packing element comprising a resilient rubber material and a wear-resisting surfacing material.

3. A laminated shaped packing comprising adjacent layers of leather and resilient rubber material.

4. A composite shaped packing member comprising a layer of leather and a layer of resilient rubber material secured to said leather.

5. A cup leather consisting of two cup-shaped elements of leather of different sizes and an intermediate cup-shaped element of resilient rubber material contacting with the outer face of one of said leather elements and the inner face of the other and bonded to said faces to form a composite article.

CHARLES W. QUIMBY.